United States Patent
Aoyama

(10) Patent No.: US 7,673,096 B2
(45) Date of Patent: Mar. 2, 2010

(54) CONTROL APPARATUS FOR CONTROLLING VIRTUAL STORAGE

(75) Inventor: Katsuo Aoyama, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 504 days.

(21) Appl. No.: 11/589,182

(22) Filed: Oct. 30, 2006

(65) Prior Publication Data
US 2007/0300034 A1 Dec. 27, 2007

(30) Foreign Application Priority Data
Jun. 27, 2006 (JP) .............................. 2006-176218

(51) Int. Cl.
G06F 12/02 (2006.01)
G06F 12/14 (2006.01)
(52) U.S. Cl. ....................... 711/112; 711/161; 711/170; 711/203; 711/206
(58) Field of Classification Search ................. 711/206, 711/203, 161, 170, 112, 101
See application file for complete search history.

(56) References Cited

U.S. PATENT DOCUMENTS

| | | | |
|---|---|---|---|
| 6,185,661 B1* | 2/2001 | Ofek et al. ................. | 711/145 |
| 6,397,351 B1* | 5/2002 | Miller et al. ................. | 714/13 |
| 7,487,395 B2* | 2/2009 | van Ingen et al. ............ | 714/16 |
| 2002/0144069 A1* | 10/2002 | Arakawa et al. ............. | 711/162 |
| 2003/0009697 A1 | 1/2003 | Uehata et al. | |
| 2004/0186858 A1* | 9/2004 | McGovern et al. .......... | 707/200 |
| 2005/0210211 A1* | 9/2005 | Kodama ..................... | 711/163 |
| 2005/0235095 A1* | 10/2005 | Winarski et al. .............. | 711/4 |
| 2005/0268055 A1* | 12/2005 | Nonaka et al. .............. | 711/162 |
| 2006/0031651 A1* | 2/2006 | Nonaka et al. .............. | 711/163 |
| 2006/0053262 A1* | 3/2006 | Prahlad et al. .............. | 711/162 |
| 2006/0085487 A1 | 4/2006 | Hara et al. | |

(Continued)

FOREIGN PATENT DOCUMENTS

JP 2001-125815 5/2001

(Continued)

OTHER PUBLICATIONS

Storage ETERNUS VS900 Virtualization Switch: Fujitsu (retrieved on Jun. 5, 2006), Internet URL:http://storage-system.fujitsu.com/jp/products/switch/vs900/>).

(Continued)

*Primary Examiner*—Matt Kim
*Assistant Examiner*—Michael C Krofcheck
(74) *Attorney, Agent, or Firm*—Staas & Halsey LLP

(57) ABSTRACT

A virtual storage control apparatus of the present invention writes data of a write request in an empty block of a virtual disk for data integrity to which any malicious access or false operation is not made, and records the time and the way of rewriting the data into the virtual disk by the write request on a rewrite information storage unit. When there is a data restore request for the virtual disk by designating a virtual disk and write time, the virtual storage control apparatus reads the data of the virtual disk at the write time from a virtual disk for data integrity, based on the information in the rewrite information storage unit, and restores the data of the virtual disk at the write time. With this configuration, the integrity of the data updated successively with the passage of time can be implemented.

9 Claims, 9 Drawing Sheets

U.S. PATENT DOCUMENTS

2006/0085663 A1* 4/2006 Sutoh .......................... 714/1
2006/0227585 A1* 10/2006 Tomoda ...................... 365/36
2006/0242371 A1* 10/2006 Shono et al. ................ 711/162

FOREIGN PATENT DOCUMENTS

| JP | 2002-251324 | 9/2002 |
|----|-------------|--------|
| JP | 2003-76610 | 3/2003 |
| JP | 2005-122611 | 5/2005 |
| JP | 2005-208950 | 8/2005 |
| JP | 2006-79626 | 3/2006 |
| JP | 2006-92276 | 4/2006 |
| JP | 2006-107162 | 4/2006 |

OTHER PUBLICATIONS

Office Action issued in corresponding Japanese Patent Application No. 2006-176218; mailed on May 13, 2008.
Office Action mailed on Dec. 9, 2008 and issued in corresponding Japanese Patent Application No. 2006-176218.

* cited by examiner

FIG.3

| VIRTUAL DISK NUMBER | INTEGRITY FLAG | NUMBER OF HOLDING DAYS | BACKUP VOLUME |
|---|---|---|---|
| 0001 | VALID | 365 | BACKUP POOL 1 |
| 0002 | INVALID | NULL | NULL |
| 0003 | VALID | 1825 | NULL |
| . | | | |
| . | | | |
| . | | | |

FIG.4

| VIRTUAL DISK NUMBER | VIRTUAL LBA | REAL DISK NUMBER | REAL LBA |
|---|---|---|---|
| 0001 | 0 | 10 | 0 |
| 0001 | 1 | 10 | 1 |
| 0001 | 2 | 10 | 2 |
| 0001 | 3 | 10 | 3 |
| 0001 | 4 | 10 | 4 |
| 0001 | 5 | 11 | 0 |
| 0001 | 6 | 11 | 1 |
| 0001 | 7 | 11 | 2 |
| 0001 | 8 | 11 | 3 |
| 0001 | 9 | 11 | 4 |
| 0003 | 0 | 30 | 0 |
| 0003 | 1 | 30 | 1 |
| 0003 | 2 | 30 | 2 |
| . | | | |
| . | | | |
| . | | | |

FIG.5

| VIRTUAL DISK NUMBER | REWRITE TIME | VIRTUAL LBA | REAL DISK NUMBER | REAL LBA |
|---|---|---|---|---|
| 0001 | 2004/02/01 09:10:50 123 | 0 | 9001 | 0 |
| 0001 | 2004/02/01 09:10:50 123 | 1 | 9001 | 1 |
| 0001 | 2004/02/12 12:25:10 345 | 0 | 9001 | 2 |
| 0001 | 2004/02/12 12:25:10 345 | 1 | 9001 | 3 |
| 0001 | 2004/02/12 12:25:10 345 | 2 | 9001 | 4 |
| 0001 | 2004/03/14 05:50:03 123 | 0 | 9001 | 5 |
| 0001 | 2004/03/14 05:50:03 123 | 2 | 9001 | 6 |
| 0001 | 2004/03/14 05:50:03 123 | 5 | 9001 | 7 |

FIG.6

| VIRTUAL DISK NUMBER | VIRTUAL LBA | REAL DISK NUMBER | REAL LBA |
|---|---|---|---|
| 10000 | 0 | 9001 | 2 |
| 10000 | 1 | 9001 | 3 |
| 10000 | 2 | 9001 | 4 |
| 10000 | 3 | 10 | 3 |
| 10000 | 4 | 10 | 4 |
| 10000 | 5 | 11 | 0 |
| 10000 | 6 | 11 | 1 |
| 10000 | 7 | 11 | 2 |
| 10000 | 8 | 11 | 3 |
| 10000 | 9 | 11 | 4 |

FIG.7

| VIRTUAL DISK NUMBER | REWRITE TIME | VIRTUAL LBA | REAL DISK NUMBER | REAL LBA |
|---|---|---|---|---|
| 0001 | 2004/07/23 14:10:50 123 | 0 | 100001 | 0 |
| 0001 | 2004/07/23 14:10:50 123 | 1 | 100001 | 1 |
| 0001 | 2004/07/23 14:10:50 123 | 2 | 100001 | 2 |
| 0001 | 2001/11/08 06:47:10 345 | 1 | 100001 | 3 |
| 0001 | 2001/11/08 06:47:10 345 | 2 | 100001 | 4 |
| 0001 | 2001/06/27 05:50:03 123 | 0 | 100001 | 5 |
| 0001 | 2001/06/27 05:50:03 123 | 2 | 100001 | 6 |
| 0001 | 2001/06/27 05:50:03 123 | 5 | 100001 | 7 |

CONTROL APPARATUS FOR CONTROLLING VIRTUAL STORAGE

CROSS-REFERENCE TO RELATED APPLICATIONS

This application claims the conventional priority based on Japanese Application No. 2006-176218, filed on Jun. 27, 2006, the disclosures of which are incorporated herein by reference.

BACKGROUND OF THE INVENTION

1. Field of the Invention

The present invention generally relates to a virtual storage control apparatus for controlling a virtual storage and a virtual storage control program for use to realize the virtual storage control apparatus, and more particularly to a virtual storage control apparatus that realizes the data integrity for the data updated successively with the passage of time, and a virtual storage control program for use to realize the virtual storage control apparatus.

2. Description of the Related Art

Since it is apprehended that the file data is rewritten due to a malicious access or false operation, it is necessary to prevent the file data from being rewritten due to malicious access or false operation.

Conventionally, the file is made in the form of WORM (Write-Once, Read-Many) to prevent the file data from being rewritten due to malicious access or false operation (for example, refer to patent document 1: Japanese Patent Application Laid-Open No. 2006-092276).

On the other hand, a technique of a virtualization switch that operates to appear to a host apparatus as if a plurality of real disks were one disk (virtual disk) is employed.

In this virtualization switch, the correspondence between the LBA (Logical Block Address) of a virtual disk and the LBA of a real disk is managed, and access is made by specifying the storage block of the real disk associated with the storage block of the virtual disk designated by the host apparatus based on its correspondence, whereby a plurality of real disks appear to be one virtual disk (for example, refer to non-patent document 1: Storage ETERNUS VS900 Virtualization Switch: Fujitsu (retrieved on Jun. 5, 2006).

A user owns the resources of data that should not be lost or altered such as official documents, web site or access log. Therefore, it is required that the integrity of the data is implemented.

On the other hand, when a plurality of real disks distributed over a network are employed, it is very convenient to use a technique of virtualization switch to construct a system because the plurality of real disks appear to be one disk.

In the background of this situation, when the system is constructed using a virtualization switch, it is required to implement the integrity of the data stored in the real disk and owned by the user.

A method for realizing the integrity of data involves making the file in the form of WORM. Employing this method, when there is a write request for writing data in a storage block where the data is once written, the write request is not accepted. Consequently, the integrity of the data stored in the real disk and owned by the user can be achieved.

However, there is a problem that the integrity of data updated successively with the passage of time cannot be assured by this method.

Since the write request for writing data in the storage block in which the data is once written is not accepted, the integrity of data updated successively with the passage of time cannot be achieved.

SUMMARY OF THE INVENTION

It is an object of the present invention to provide a virtual storage control apparatus for implementing the integrity of data updated successively with the passage of time.

It is another object of the present invention to provide a virtual storage control method for implementing the integrity of data updated successively with the passage of time.

It is still another object of the present invention to provide a virtual storage control program for implementing the integrity of data updated successively with the passage of time.

The virtual storage control apparatus of the present invention is the virtual storage control apparatus for specifying a storage block of a real disk associated with a storage block of a virtual disk designated by a host apparatus based on a correspondence between the storage block of the virtual disk and the storage block of the real disk and accessing to the specified storage block. The virtual storage control apparatus comprises a storage unit storing information indicating whether or not an instruction of data integrity is set for each virtual disk, a determination unit determining whether or not the instruction of data integrity is set for the virtual disk designated by the host apparatus by referring to the information in the storage unit when there is a write request for data from the host apparatus, a write unit writing the data of the write request in an empty block of the real disk configuring a virtual disk for data integrity when the determination unit determines that the instruction of data integrity is set, and a recording unit recording write volume information for the real disk in which the write unit writes the data of the write request, write request volume information for the virtual disk designated by the write request, and write date and time information on a rewrite information storage unit.

The virtual storage control method of the present invention is the virtual storage control method in a virtual storage control apparatus for specifying a storage block of a real disk associated with a storage block of a virtual disk designated by a host apparatus based on a correspondence between the storage block of the virtual disk and the storage block of the real disk and accessing to the specified storage block. The virtual storage control method comprises determining whether or not an instruction of data integrity is set for the virtual disk designated by the host apparatus by referring to information in a storage unit storing the information indicating whether or not the instruction of data integrity is set for each virtual disk when there is a write request for data from the host apparatus, writing the data of the write request in an empty block of the real disk configuring a virtual disk for data integrity in case of determining that the instruction of data integrity is set, and recording write volume information for the real disk in which the data of the write request is written, write request volume information for the virtual disk designated by the write request, and write date and time information on a rewrite information storage unit.

The virtual storage control program of the present invention is the virtual storage control program for specifying a storage block of a real disk associated with a storage block of a virtual disk designated by a host apparatus based on a correspondence between the storage block of the virtual disk and the storage block of the real disk and accessing to the specified storage block. The program causes a computer to execute determining whether or not an instruction of data integrity is set for the virtual disk designated by the host apparatus by referring to information in a storage unit storing the information indicating whether or not the instruction of data integrity is set for each virtual disk when there is a write request for data from the host apparatus, writing the data of the write request in an empty block of the real disk configuring a virtual disk for data integrity in case of determining that the instruction of data integrity is set, and recording write volume information for the real disk in which the data of the write request is written, write request volume information for the virtual disk designated by the write request, and write date and time information on a rewrite information storage unit.

According to the present invention, the virtual storage control apparatus specifies the storage block of the real disk associated with the storage block of the virtual disk designated by the host apparatus based on the correspondence between the storage block of the virtual disk and the storage block of the real disk and accesses to the specified storage block. Therefore, according to the present invention, the integrity of the data updated successively with the passage of time can be implemented.

BRIEF DESCRIPTION OF THE DRAWINGS

FIG. 3 is a view showing one example of table data in a virtual disk attribute table.

FIG. 4 is a view showing one example of table data in the virtual disk configuration table.

FIG. 5 is a view showing one example of table data in a rewrite information table.

FIG. 6 is a view showing one example of table data in a virtual disk reference configuration table.

FIG. 7 is a view showing one example of table data in a backup information table.

DETAILED DESCRIPTION OF THE PREFERRED EMBODIMENTS

Figure 1:
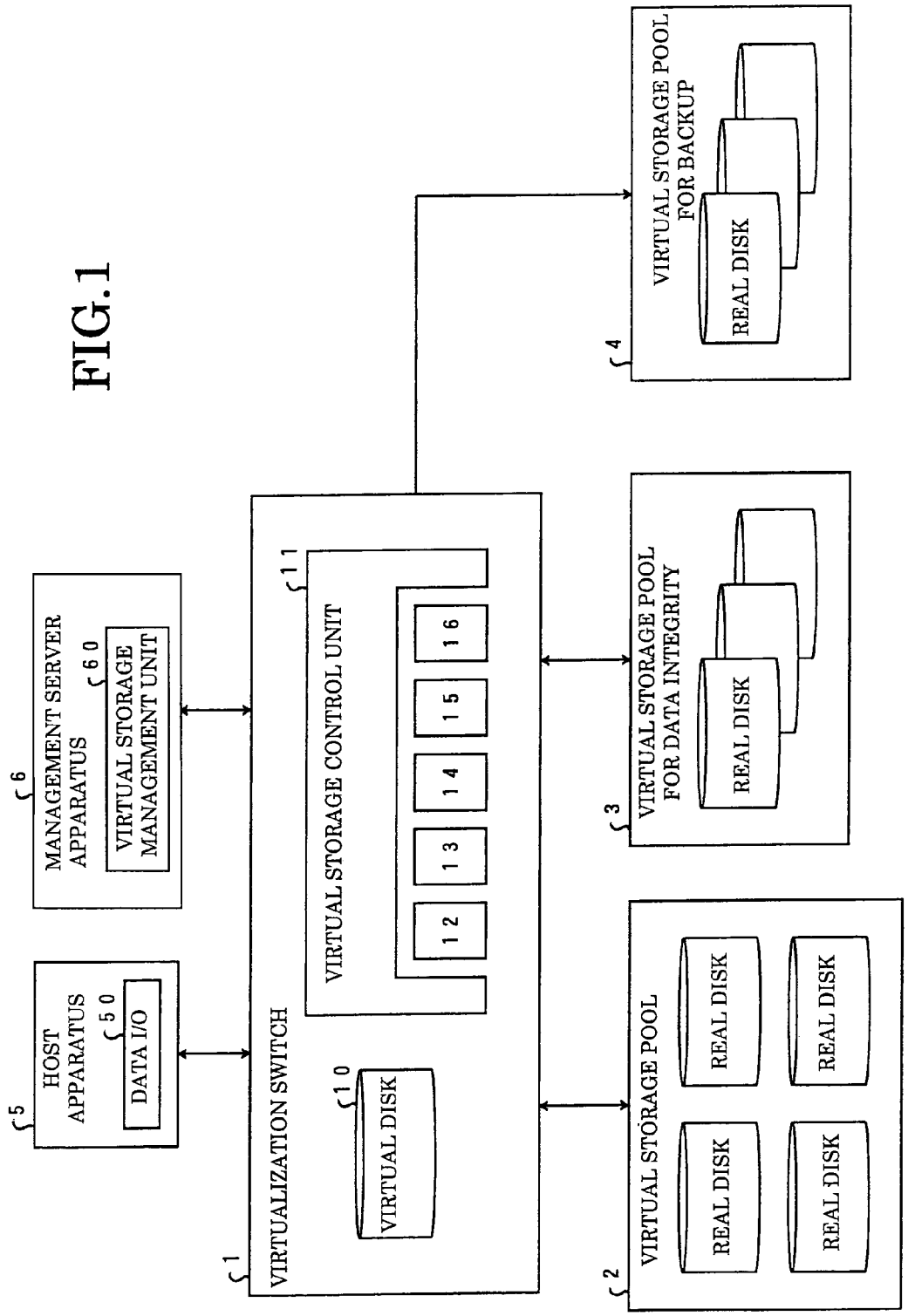
FIG. 1 is a system structure diagram of a virtual storage control system according to the present invention.

Hereinafter, the outline of the present invention is explained. A virtual storage control apparatus of the present invention specifies a storage block of a real disk associated with a storage block of a virtual disk designated by a host apparatus based on the correspondence between the storage block of the virtual disk and the storage block of the real disk and accesses to the specified storage block. The virtual storage control apparatus comprises (1) a storage unit storing information indicating whether or not an instruction of data integrity is set for each virtual disk, (2) a determination unit determining whether or not the instruction of data integrity is set for the virtual disk designated by the host apparatus by referring to the information in the storage unit when there is a write request for data from the host apparatus, (3) a write unit writing the data of the write request in an empty block of the real disk configuring a virtual disk for data integrity when the determination unit determines that the instruction of data integrity is set, (4) a recording unit recording write volume information for the real disk in which the write unit writes the data of the write request, write request volume information for the virtual disk designated by the write request, and write date and time information on a rewrite information storage unit, (5) a first obtaining unit obtaining, when there is a data restore request for the virtual disk by designating a virtual disk and date and time information, the write volume information associated with the storage block of the virtual disk by referring to the information in the rewrite information storage unit based on the designated information, (6) a second obtaining unit obtaining write volume information of the data written in the real disk based on the correspondence between the storage block of the virtual disk and the storage block of the real disk, for the storage block of the virtual disk for which the first obtaining unit cannot obtain the write volume information, and (7) a restore unit restoring the data of the virtual disk of the restore request based on the write volume information obtained by the first obtaining unit and the second obtaining unit.

Preferably, the virtual storage control apparatus of the present invention further comprises a detection unit detecting information passing a predetermined data holding time (that may be set for each virtual disk) from the recording of the information among information stored in the rewrite information storage unit, and an execution unit saving the data written in the virtual disk for data integrity in a storage unit for backup and deleting the data from the virtual disk for data integrity based on the information detected by the detection unit, as well as saving the information in the storage unit for backup and deleting the information from the rewrite information storage unit.

Herein, each of the above described processing unit may be realized by a computer program. The computer program is provided by being recorded in an appropriate computer-readable recording medium, or distributed via a network, and installed to be operable on a control unit such as a CPU to implement the present invention, when practicing the present invention.

When the host apparatus issues a write request of the data by designating the virtual disk and the storage block of the virtual disk, the virtual storage control apparatus of the present invention determines whether or not a data integrity instruction is set for the virtual disk by referring to the information in the storage unit.

If the virtual storage control apparatus determines that a data integrity instruction is set for the virtual disk designated by the host apparatus, when the data of the write request is written in the storage block of the virtual disk designated by the host apparatus and the storage block of the real disk, the virtual storage control apparatus specifies the empty block of the real disk configuring the virtual disk for data integrity, and writes the data of the write request in the specified empty block.

Then, the virtual storage control apparatus records write volume information (the identifiers of the real disk and the storage block) of the real disk configuring the virtual disk for data integrity in which the data of the write request is written, write request volume information (the identifiers of the virtual disk and the storage block) of the virtual disk designated by the write request, and write date and time information on the rewrite information storage unit.

In this way, if the data integrity instruction is set for the virtual disk, when the data of the write request is written in the virtual disk designated by the write request, the virtual storage control apparatus writes the data of the write request in the empty block of the real disk configuring the virtual disk for data integrity, and records the write volume information for the real disk, the write request volume information for the virtual disk designated by the write request, and the write date and time information on the rewrite information storage unit.

On the other hand, when the write volume information for the real disk associated with the storage block of the virtual disk is designated by the operator who operates the management server apparatus (management server apparatus 6 as shown in FIG. 1) and a data restore request for the virtual disk is issued, the virtual storage control apparatus obtains the write volume information for the real disk associated with the storage block of the virtual disk by referring to the information in the rewrite information storage unit according to the designated information.

The virtual storage control apparatus obtains the write volume information for the real disk associated with the storage block of the virtual disk by obtaining, for example, (a) the write volume information having the date and time information nearest to the designated date and time information, (b) the write volume information having the date and time information nearest to the designated date and time information among the date and time information within a certain data and time range from the designated date and time information, (c) the write volume information having the date and time information nearest to the designated date and time information among the date and time information not passing the designated date and time information, or (d) the write volume information having the date and time information nearest to the designated date and time information among the date and time information within a certain date and time range from the designated date and time information and not passing the designated date and time information.

Then, for the storage block of the virtual disk for which the write volume information cannot be obtained, the virtual storage control apparatus obtains the write volume information of the data written in the real disk based on the correspondence between the storage block of the virtual disk and the storage block of the real disk.

Then, the virtual storage control apparatus restores the data of the virtual disk of the restore request based on the obtained write volume information for the real disk.

In this way, the virtual storage control apparatus of the present invention writes the data of the write request in an empty block of the virtual disk for data integrity to which any malicious access or false operation is not made, and records the time and the way of rewriting the data into the virtual disk by the write request on the rewrite information storage unit. When there is a data restore request for the virtual disk by designating the virtual disk and the write time, the virtual storage control apparatus reads the data of the virtual disk at the write time from the virtual disk for data integrity, based on the information in the rewrite information storage unit, and restores the data of the virtual disk at the write time.

An embodiment of the present invention is described below in detail.

FIG. 1 shows a system structure of a virtual storage control system according to the present invention.

As shown in FIG. 1, the virtual storage control system according to the present invention includes a virtualization switch 1 implementing a virtual disk 10, a virtual storage pool 2 having a plurality of real disks configuring a RAID and so on, a virtual storage pool for data integrity 3 having a plurality of real disks prepared for data integrity, a virtual storage pool for backup 4 having a plurality of real disks prepared for backup, a host apparatus 5 having a data I/O 50 and issuing an access request of the virtual disk 10 to the virtualization switch 1, and a management server apparatus 6 having a virtual storage management unit 60 and performing a management process for the virtualization switch 1.

Herein, for the sake of convenience, the virtualization switch 1 implements one virtual disk 10 in FIG. 1, but actually implements a plurality of virtual disks 10.

Figure 2:
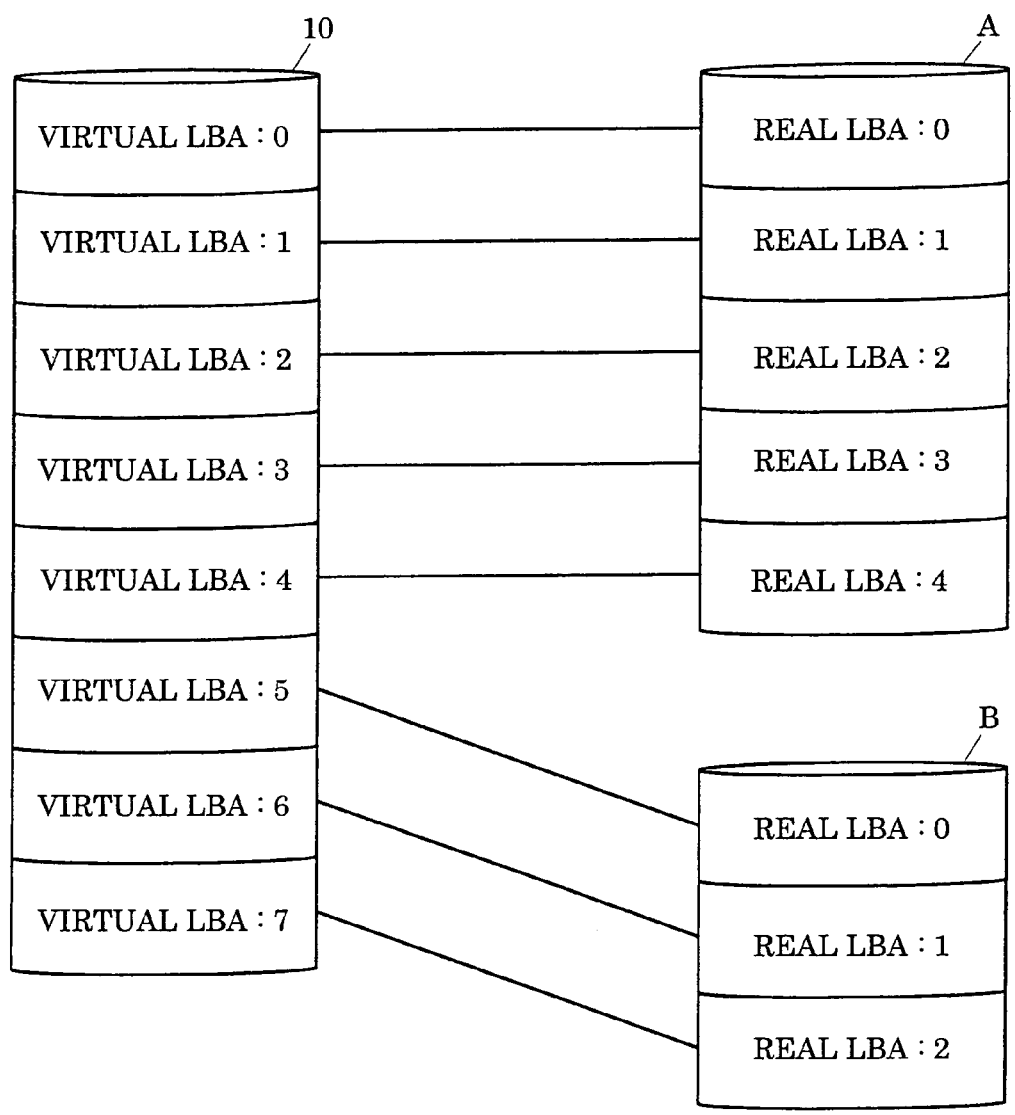
FIG. 2 is an explanatory view of the correspondence managed by a virtualization switch.

The virtualization switch 1 operates to appear to the host apparatus 5 as if a plurality of real disks (for example, real disks A and B) configuring the virtual storage pool 2 were one virtual disk 10 by configuring the correspondence between the LBA (virtual LBA) of the virtual disk 10 and the LBA (real LBA) of the real disk configuring the virtual storage pool 2, as shown in FIG. 2.

The virtualization switch 1 includes a virtual storage control unit 11 to perform a configuration process of the virtual disk 10, a process for automatically saving the write data written from the host apparatus 5 into the virtual disk 10 in a unit of block (for example, 512 bytes) in the virtual storage pool for data integrity 3. Additionally, when there is a reference request for a status of the virtual disk 10 at a certain time from the operator who operates the management server apparatus 6, the virtual storage control unit 11 performs a process for restoring the virtual disk 10 with the data held at that time according to the data saved on the virtual storage pool for data integrity 3. Moreover, the virtual storage control unit 11 performs a process for transferring the data passing the number of data retention days among the data saved on the virtual storage pool for data integrity 3 to the virtual storage pool for backup 4.

And the virtual storage control unit 11 controls a virtual disk attribute table 12, a virtual disk configuration table 13, a rewrite information table 14, a virtual disk reference configuration table 15 and a backup information table 16 to perform the above described processes.

FIG. 3 shows one example of table data in the virtual disk attribute table 12, FIG. 4 shows one example of table data in the virtual disk configuration table 13, FIG. 5 shows one example of table data in the rewrite information table 14, FIG. 6 shows one example of table data in the virtual disk reference configuration table 15, and FIG. 7 shows one example of table data in the backup information table 16.

The virtual disk attribute table 12 manages the information indicating whether or not an integrity flag (flag indicating that the data is maintained) is set for the virtual disk 10, the information, which is designable when the integrity flag is set for the virtual disk 10, indicating information about how many days (data holding days) the data of the virtual disk 10 is held in the virtual storage pool for data integrity 3, and the information on a volume (backup volume) to which the data of the virtual disk 10 is saved when the data passes the number of data holding days (the information indicating which real disk in the virtual storage pool for backup 4 is employed as the backup volume), associated with the disk number of the virtual disk 10, as shown in FIG. 3.

The virtual disk configuration table 13 manages the correspondence between the disk number and virtual LBA of the virtual disk 10 and the disk number and real LBA of the real disk configuring the virtual storage pool 2. Thus, the virtual disk configuration table 13 manages the information indicating which real LBA of which real disk in the virtual storage pool 2 each virtual LBA of each virtual disk 10 is mapped to, as shown in FIG. 4.

The rewrite information table 14 manages the information that the data indicated by the virtual disk number and the virtual LBA is saved on which real LBA of which real disk in the virtual storage pool for data integrity 3. The rewrite information table 14 manages the information on date and time at which the data is saved (hereinafter referred to as rewrite time information or write date and time information), associated with the disk number and virtual LBA of the virtual disk 10, as shown in FIG. 5.

The virtual disk reference configuration table 15 manages the information indicating what data the virtual disk 10 restored as the virtual disk 10 at a certain time includes. The virtual disk reference configuration table 15 manages the information indicating which real LBA of which real disk the data designated by the virtual disk number and the virtual LBA is stored in, associated with the disk number (temporary disk number is assigned) and the virtual LBA of the restored virtual disk 10, as shown in FIG. 6. Herein, the real disks at this time include the real disk configuring the virtual storage pool 2 and the real disk configuring the virtual storage pool for data integrity 3.

The backup information table 16 manages the information indicating which data is transferred from the virtual storage pool for data integrity 3 to the virtual storage pool for backup 4 because the data has passed the number of data holding days. The backup information table 16 has the same table structure as the rewrite information table 14 because the copy of the information recorded on the rewrite information table 14 is recorded, as shown in FIG. 7.

FIGS. 8 to 13 show one example of the processing flows performed by the virtual storage control unit 11 provided for the virtualization switch 1.

The processes of the virtual storage control system according to the present invention as shown in FIG. 1 will be described below in detail in accordance with those processing flows.

First of all, a process of the virtual storage control part 11 provided for the virtualization switch 1 when there is a creation request for the virtual disk 10 will be described below according to a processing flow of FIG. 8.

Figure 8:
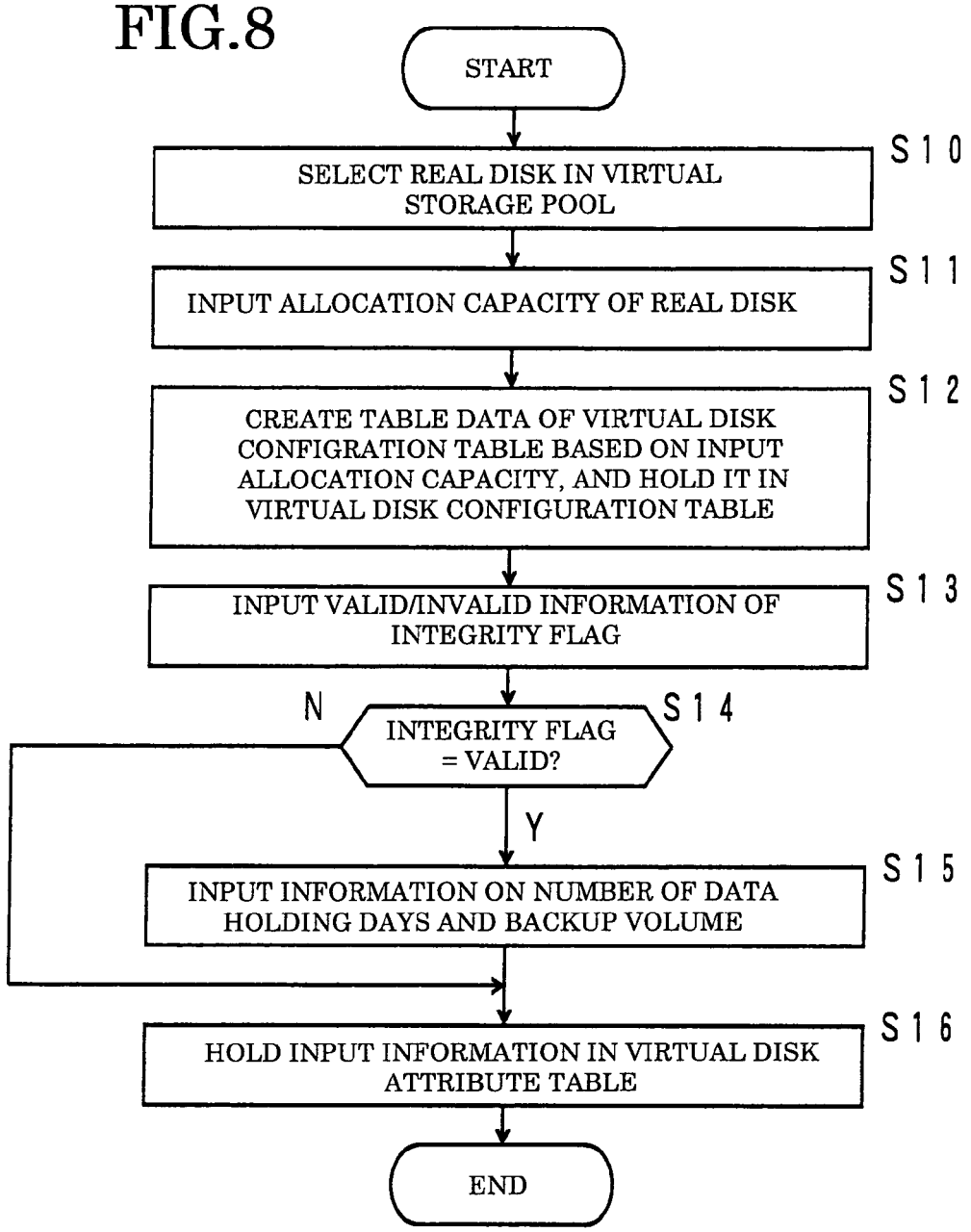
FIG. 8 is a processing flow performed by a virtual storage control unit.

When there is a request (creation request) for creating the virtual disk 10 from the operator who operates the management server apparatus 6, the virtual storage control unit 11 provided for the virtualization switch 1 firstly selects the real disk in the virtual storage pool 2 that is to be mapped to the virtual disk 10 of the creation request at step S10 as shown in the processing flow of FIG. 8.

Subsequently, at step S11, the virtual storage control unit 11 inputs an allocation capacity of the selected real disk that is to be allocated to the virtual disk 10.

Then, at step S12, the virtual storage control unit 11 creates the table data of the virtual disk configuration table 13 and holds the table data in the virtual disk configuration table 13 based on the input allocation capacity.

That is, the virtual storage control unit 11 calculates the number of blocks (one block is 512 bytes, for example) included in the real disk based on the input allocation capacity, creates the table data of the virtual disk configuration table 13 based on the result of the calculation, and holds the table data in the virtual disk configuration table 13.

Subsequently, at step S13, the valid/invalid information of the integrity flag that is set for the virtual disk 10 of the creation request is inputted.

That is, when the virtual disk 10 of creation request is set such that the data is maintained, the operator inputs the information of validating the integrity flag. Then, the virtual storage control unit 11 inputs the valid information of the integrity flag. On the other hand, when the virtual disk 10 of the creation request is set such that the data is not maintained, the operator inputs the information of invalidating the integrity flag. Then, the virtual storage control unit 11 inputs the invalid information of the integrity flag.

Subsequently, at step S14, the virtual storage control unit 11 determines whether the valid information of the integrity flag is inputted. When the virtual storage control unit 11 determines that the valid information of the integrity flag is inputted, the process proceeds to step S15. At the step S15, the virtual storage control unit 11 inputs the information on the number of the data holding days and the backup volume for the virtual disk 10 of the creation request.

Subsequently, at step S16, the virtual storage control unit 11 holds the input information (valid information of the integrity flag, information on the number of data holding days, information on the backup volume) in the virtual disk attribute table 12. Then, the process is ended.

On the other hand, at the step S14, when the virtual storage control unit 11 determines that the invalid information of the integrity flag is inputted, the process directly proceeds to the step S16 without performing the process at the step S15. Then, the virtual storage control unit 11 holds the input information (invalid information of the integrity flag) in the virtual disk attribute table 12. Then, the procedure is ended.

In this way, the virtual storage control unit 11 provided for the virtualization switch 1 creates the virtual disk configuration table 13 for the virtual disk 10 of the creation request according to the processing flow of FIG. 8, and defines a mapping relation between the virtual disk 10 and the real disk, when there is a creation request for the virtual disk 10 from the operator who operates the management server apparatus 6. The virtual storage control unit 11 also creates the virtual disk attribute table 12 for the virtual disk 10 of the creation request, and defines a data integrity policy for the virtual disk 10 of the creation request.

Next, a process of the virtual storage control part 11 provided for the virtualization switch 1 performed when the host apparatus 5 issues a request for writing data (write request) by designating the virtual disk number and virtual LBA will be described below according to a processing flow of FIG. 9.

Figure 9:
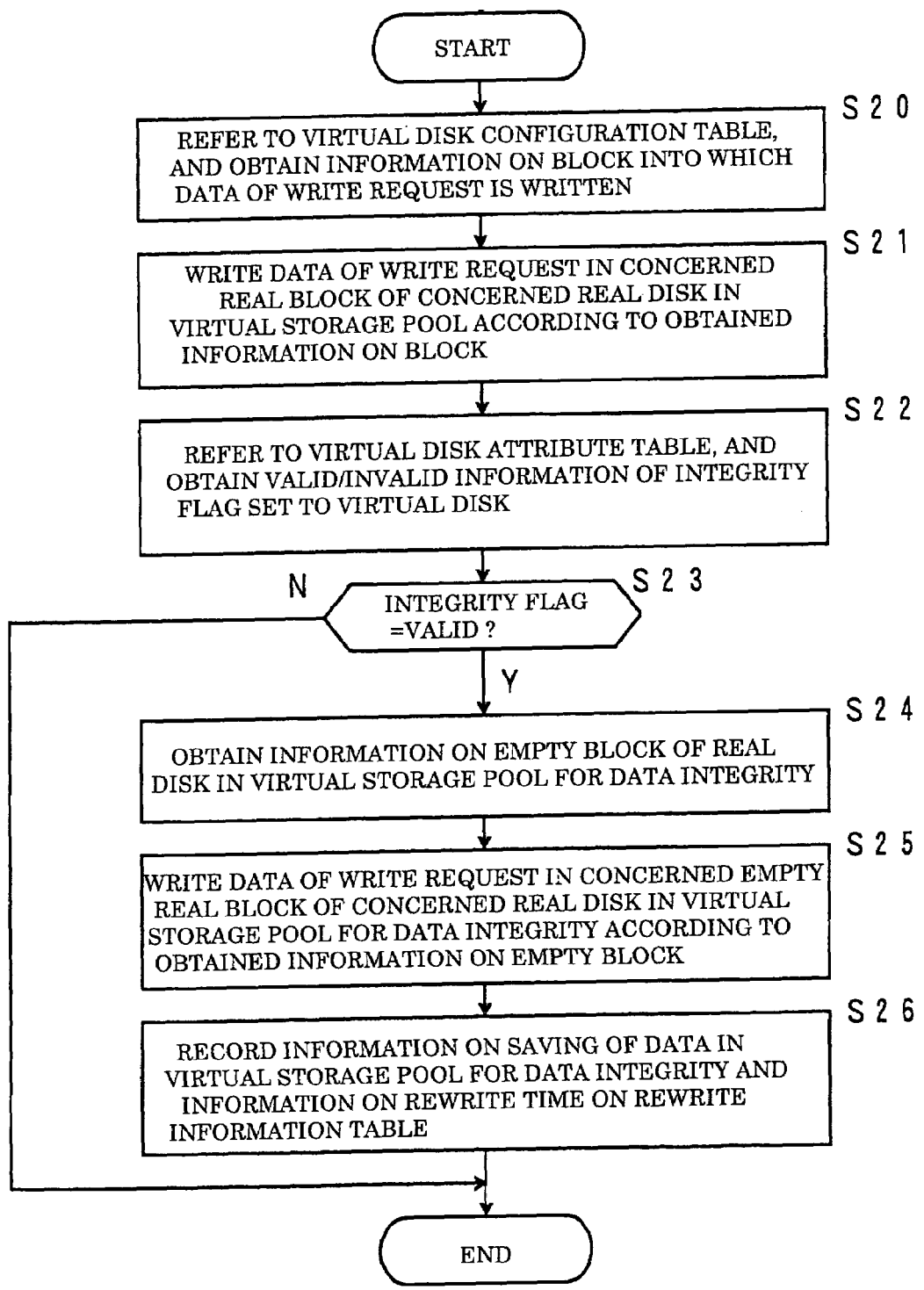
FIG. 9 is a processing flow performed by the virtual storage control unit.

When the host apparatus 5 issues the write request by designating the virtual disk number and virtual LBA, the virtual storage control unit 11 provided for the virtualization switch 1 firstly refers to the virtual disk configuration table 13 using the virtual disk number and virtual LBA designated by the host apparatus 5 as keys, and obtains the real disk number and real LBA associated with the virtual disk number and virtual LBA in the virtual storage pool 2 at step S20 as shown in the processing flow of FIG. 9. Consequently, the virtual storage control unit 11 obtains information on the block into which the data of the write request is written.

Subsequently, at step S21, the virtual storage control unit 11 writes the data of the write request in the concerned real block of the concerned real disk in the virtual storage pool 2 according to the obtained information on the block.

Subsequently, at step S22, the virtual storage control unit 11 refers to the virtual disk attribute table 12 using the virtual disk number designated by the host apparatus 5 as a key, and obtains the valid/invalid information of the integrity flag set for the virtual disk 10 indicated by the virtual disk number.

Subsequently, at step S23, the virtual storage control unit 11 determines whether or not the information for validating the integrity flag is set for the virtual disk 10 indicated by the virtual disk number designated by the host apparatus 5 based on the obtained valid/invalid information of the integrity flag. When the virtual storage control unit 11 determines that the information for validating the integrity flag is set, the process proceeds to step S24, and the virtual storage control unit 11 obtains the information on an empty block of the real disk in the virtual storage pool for data integrity 3.

Subsequently, at step S25, the virtual storage control unit 11 writes the data of the write request in the concerned empty real block of the concerned real disk in the virtual storage pool for data integrity 3 (namely, saves the data in the virtual storage pool for data integrity 3) according to the obtained information on the empty block.

Subsequently, at step S26, the virtual storage control unit 11 records the virtual disk number and virtual LBA designated by the host apparatus 5, the real disk number and real LBA in the virtual storage pool for data integrity 3 to which the data of the write request is written as information on saving of the data, and write time information on the rewrite information table 14. The write time information is the information on the time (rewrite time) when the real block in the virtual storage pool 2 is rewritten through the process at step S21. Then, the process is ended.

On the other hand, when the virtual storage control unit 11 determines that the information of validating the integrity flag is not set for the virtual disk 10 indicated by the virtual disk number designated by the host apparatus 5 at the step S23, the process is ended without performing the process of the steps S24 to S26.

In this way, when the host apparatus 5 issues a write request for data by designating the virtual disk number and virtual LBA, the virtual storage control unit 11 provided for the virtualization switch 1 writes the data of the write request in the real block of the real disk in the virtual storage pool 2 mapped by the table data of the virtual disk configuration table 13. When a data integrity instruction is set for the virtual disk 10 indicated by the virtual disk number, the virtual storage control unit 11 saves the data of the write request on the empty real block of the real disk in the virtual storage pool for data integrity 3, as well as records information on the saving of the data and information on the date and time at which the data is saved on the rewrite information table 14.

According to the above described process of the virtual storage control unit 11, for example, when the data is written in the virtual block in which the virtual disk number is 1 and the virtual LBA is 0 (the real block in which the real disk number is 10 and the real LBA is 0), the information indicating that the data is saved in the real block in which the real disk number is 9001 and the real LBA is 0 (empty block in the virtual storage pool for data integrity 3), and the rewrite time is "2004/02/01 09:10:50 123" is written in the rewrite information table 14, as shown in FIG. 5.

Next, a process of the virtual storage control unit 11 provided for the virtualization switch 1 performed when the operator who operates the management server apparatus 6 issues a request for referring history (history reference request) for the virtual disk 10 by designating the virtual disk number and history reference date and time information will be described below according to a processing flow of FIG. 10.

Figure 10:
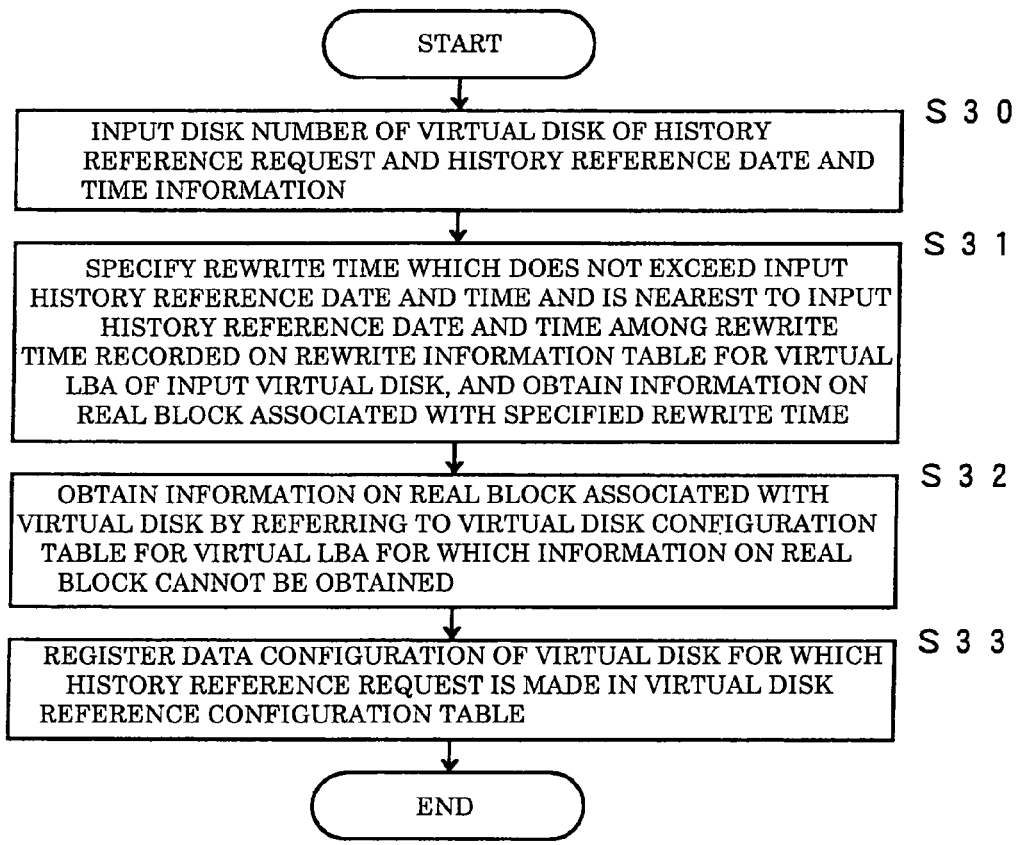
FIG. 10 is a processing flow performed by the virtual storage control unit.

When the virtual disk number and information on history reference date and time (history reference date and time information) is designated by the operator who operates the management server apparatus 6, and a history reference request for the virtual disk 10 is issued, the virtual storage control part 11 provided for the virtualization switch 1 firstly inputs the disk number of the virtual disk 10 of the history reference request and the history reference date and time information indicating at which point of time the virtual disk 10 is referred to at step S30 as shown in the processing flow of FIG. 10.

Subsequently, at step S31, the virtual storage control unit 11 specifies the rewrite time which does not exceed the input history reference date and time and is nearest to the input history reference date and time among rewrite time recorded on the rewrite information table 14, for the virtual LBA of the virtual disk 10 indicated by the input virtual disk number. Then, the virtual storage control unit 11 obtains the information on the real block (information on the real disk number and real LBA of the real disk configuring the virtual storage pool for data integrity 3) associated with the specified rewrite time.

At this time, the virtual storage control unit 11 may specify the rewrite time which does not exceed the input history reference date and time and is nearest to the input history reference date and time, under the condition that the rewrite time is within a predetermined date and time range from the input history reference date and time. Then, the virtual storage control unit 11 obtains the information on the real block associated with the specified rewrite time.

Subsequently, at step S32, the virtual storage control unit 11 obtains the information on the real block (write volume information) associated with the input virtual disk number and its virtual LBA by referring to the virtual disk configuration table 13 for the virtual LBA for which the information on the real block cannot be obtained through the process at the step S31. Here, the write volume information is the information on the real disk number and real LBA of the real disk configuring the virtual storage pool 2.

Subsequently, at step S33, the virtual storage control unit 11 registers the real block information obtained at the step S31 and the real block information obtained at the step S32 associated with the input virtual disk number and its virtual LBA in the virtual disk reference configuration table 15, thereby registering the data configuration of the virtual disk 10 of the history reference request.

According to the data configuration of the virtual disk 10 registered in the virtual disk reference configuration table 15, the virtual storage control unit 11 restores the data of the virtual disk 10 at the history reference date and time and provides the data to the host apparatus 5. Therefore, the history reference request is also a data restore request for restoring the data of the virtual disk 10. Since the data of the virtual disk 10 provided at this time is the restored data, the virtual storage control unit 11 does not accept the write request for the virtual disk 10.

In this way, when the virtual disk number and history reference date and time information is designated by the operator who operates the management server apparatus 6, and a history reference request for the virtual disk 10 is issued, the virtual storage control unit 11 provided for the virtualization switch 1 restores the data of the virtual disk 10 at the designated history reference date and time and provides the data to the operator.

Next, a process of the virtual storage control unit 11 provided for the virtualization switch 1 performed when the operator who operates the management server apparatus 6 issues a deletion request for the virtual disk 10 for history reference will be described below according to a processing flow of FIG. 11.

Figure 11:
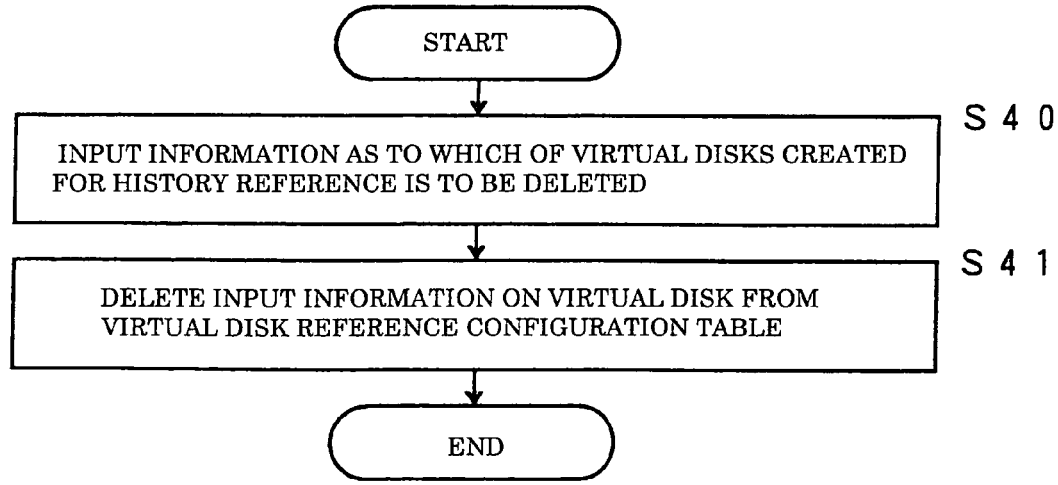
FIG. 11 is a processing flow performed by the virtual storage control unit.

When a deletion request for the virtual disk 10 for history reference is issued by the operator who operates the management server apparatus 6, the virtual storage control unit 11 provided for the virtualization switch 1 firstly inputs information as to which of the virtual disks 10 created for history reference is to be deleted according to an operation of the operator at step S40 as shown in the processing flow of FIG. 11.

Subsequently, at step S41, the virtual storage control unit 11 deletes the information on the input virtual disk 10 from the virtual disk reference configuration table 15. Then, the process is ended.

In this way, when the deletion request of the virtual disk 10 for history reference is issued by the operator who operates the management server apparatus 6, the virtual storage control unit 11 provided for the virtualization switch 1 deletes the information of the virtual disk 10.

Next, a process of the virtual storage control unit 11 provided for the virtualization switch 1 performed when the operator who operates the management server apparatus 6 issues a change request for the integrity flag set for the virtual disk 10 by designating the virtual disk number will be described below according to a processing flow of FIG. 12.

Figure 12:
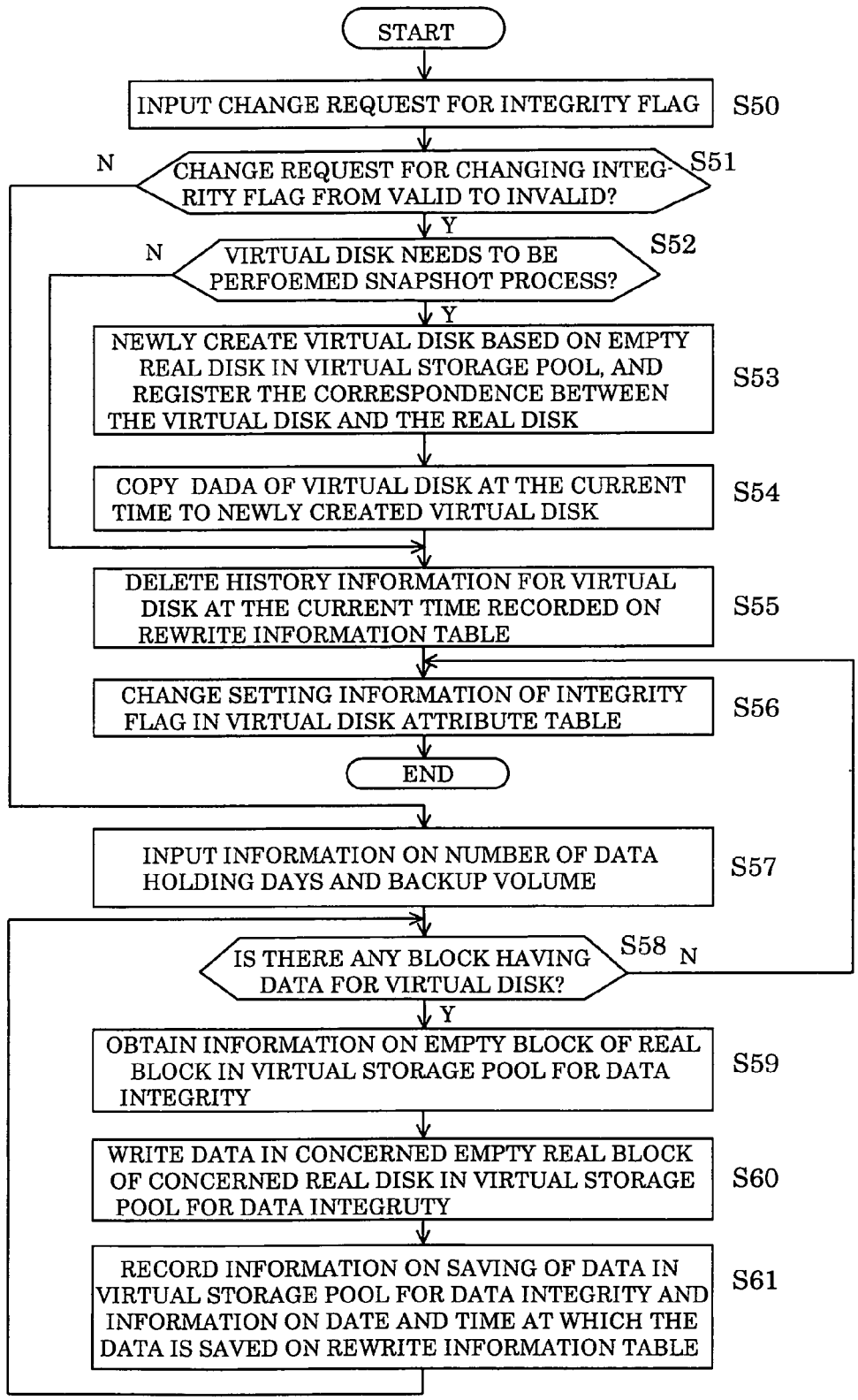
FIG. 12 is a processing flow performed by the virtual storage control unit.

When the virtual disk number is designated by the operator who operates the management server apparatus 6 and a change request for the integrity flag set for the virtual disk 10 is issued, the virtual storage control unit 11 provided for the virtualization switch 1 firstly inputs a change request for the integrity flag set for the virtual disk 10 at step S50 as shown in a processing flow of FIG. 12.

Subsequently, at step S51, the virtual storage control unit 11 determines whether or not the input change request is the request for changing the integrity flag from valid to invalid. When the virtual storage control unit 11 determines that the input change request is the request for changing the integrity flag from valid to invalid, the process proceeds to step S52. Then, the virtual storage control unit 11 determines whether or not the virtual disk 10 indicated by the virtual disk number designated by the operator who operates the management server apparatus 6 needs to be performed a snapshot process (left behind). The operator who operates the management server apparatus 6 inputs an instruction of whether or not the virtual disk 10 needs to be performed a snapshot process.

When the virtual storage control unit 11 determines that the virtual disk 10 indicated by the virtual disk number designated by the operator who operates the management server apparatus 6 needs to be performed the snapshot process according to the determination, the process proceeds to step S53. Then, the virtual storage control unit 11 newly creates the virtual disk 10 based on the empty real disk in the virtual storage pool 2, and registers the correspondence between the virtual disk 10 and the real disk (the correspondence between the virtual disk number and virtual LBA and the real disk number and real LBA) in the virtual disk configuration table 13.

Subsequently, at step S54, the virtual storage control unit 11 copies the data of the virtual disk 10 indicated by the virtual disk number designated by the operator who operates the management server apparatus 6 to the newly created virtual disk 10. That is, by copying the data of the virtual disk 10 at the current time, the virtual control unit 11 performs a snapshot process.

Subsequently, the virtual storage control unit 11 deletes the history information for the virtual disk 10 at the current time recorded on the rewrite information table 14 at step S55. Then the virtual storage control unit 11 changes the setting information of the integrity flag registered in the virtual disk attribute table 12 to invalid at step S56. Then, the process is ended.

On the other hand, at the step S52, when the virtual storage control unit 11 determines that the virtual disk 10 indicated by the virtual disk number designated by the operator who operates the management server apparatus 6 does not need to be performed a snapshot process, the process directly proceeds to step S55 without the process of the steps S53 and S54, and the virtual storage control unit 11 deletes the history information for the virtual disk 10 at the current time recorded on the rewrite information table 14. Then, at step S56, the virtual storage control unit 11 changes the setting information of the integrity flag registered in the virtual disk attribute table 12 to invalid. Then, the process is ended.

On the other hand, at the step S51, when the virtual storage control unit 11 determines that the input change request is not the request for changing the integrity flag from valid to invalid, namely, when the virtual storage control unit 11 determines that the input change request is the request for changing the integrity flag from invalid to valid, the process proceeds to step S57, and the virtual storage control unit 11 inputs the information on the number of data holding days and the backup volume for the virtual disk 10 indicated by the virtual disk number designated by the operator who operates the management server apparatus 6.

Subsequently, at step S58, the virtual storage control unit 11 determines whether or not there is any block having data for the virtual disk 10 indicated by the virtual disk number designated by the operator who operates the management server apparatus 6. When the virtual storage control unit 11 determines that there is no block having data, the process directly proceeds to step S56. Then, the virtual storage control unit 11 registers the input information on the number of data holding days and the backup volume in the virtual disk attribute table 12, and changes the setting information of the integrity flag registered in the virtual disk attribute table 12 to valid. Then, the process is ended.

On the other hand, at the step S58, when the virtual storage control unit 11 determines that there is any block having data for the virtual disk 10 indicated by the virtual disk number designated by the operator who operates the management server apparatus 6, the virtual storage control unit 11 performs the following process from step S59 to step S61 for the block having data.

That is, the virtual storage control unit 11 obtains the information on empty block of the real disk in the virtual storage pool for data integrity 3 at step S59, saves the data by writing the date in the concerned empty real block of the concerned real disk in the virtual storage pool for data integrity 3 according to the obtained information on the empty block at step S60. Then, the virtual storage control unit 11 records information on saving of the data and information on the date and time at which the data is saved on the rewrite information table 14 at step S61.

The virtual storage control unit 11 repeats the process from step S59 to step S61. When the virtual storage control unit 11 determines that the process from step S59 to step S61 is performed for all the blocks having data at step S58, the process proceeds to step S56. Then, the virtual storage control unit 11 registers the input information on the number of data holding days and information on the backup volume (backup volume information) in the virtual disk attribute table 12, and changes the setting information of the integrity flag registered in the virtual disk attribute table 12 to valid. Then, the process is ended.

In this way, when the virtual disk number is designated by the operator who operates the management server apparatus 6, and the change request for the integrity flag set for the virtual disk 10 is issued, the virtual storage control unit 11 provided for the virtualization switch 1 performs the process for changing the setting information of valid/invalid of the integrity flag according to the change request.

Next, a process of the virtual storage control unit 11 provided for the virtualization switch 1 performed when a backup period is reached will be described below according to a processing flow of FIG. 13.

Figure 13:
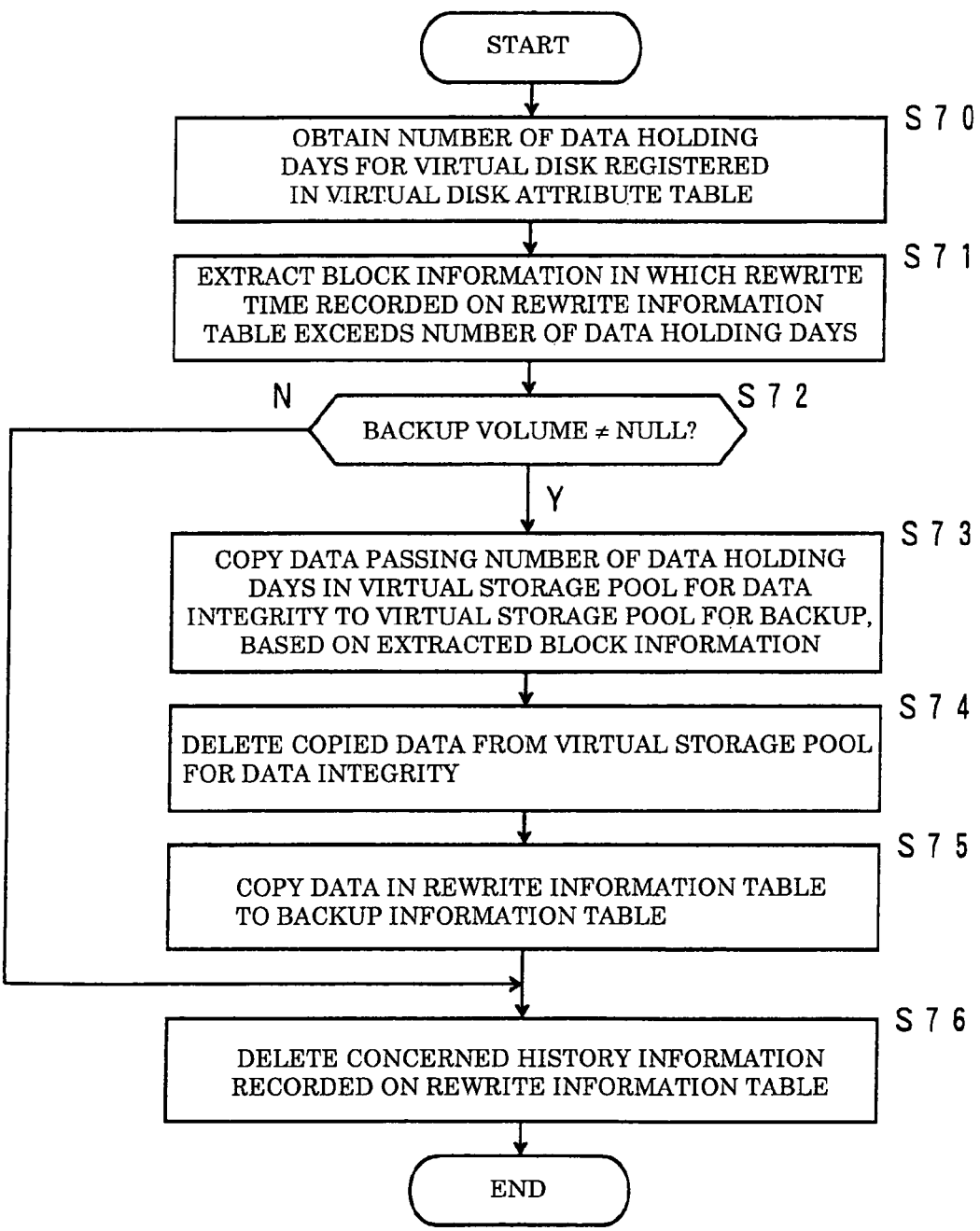
FIG. 13 is a processing flow performed by the virtual storage control unit.

When the backup period is reached, the virtual storage control unit 11 provided for the virtualization switch 1 firstly obtains the number of data holding days for the virtual disk 10 registered in the virtual disk attribute table 112 at step S70 as shown in the processing flow of FIG. 13.

Subsequently, at step S71, the virtual storage control unit 11 extracts information on block (block information) in which the rewrite time recorded on the rewrite information table 14 exceeds the number of data holding days.

Subsequently, at step S72, the virtual storage control unit 11 determines whether or not the backup volume information registered in the virtual disk attribute table 12 associated with the virtual disk 10 having the extracted block information is NULL (indicating that the data is not backed up).

When the virtual storage control unit 11 determines that the backup volume information is not NULL, the process proceeds to step S73. Then, the virtual storage control unit 11 copies the data stored in the virtual storage pool for data integrity 3 passing the number of data holding days to the concerned area of the virtual storage pool for backup 4 designated as the backup volume, based on the extracted block information. Then, at the step S74, the virtual storage control unit 11 deletes the copied data from the virtual storage pool for data integrity 3.

Subsequently, the virtual storage control unit 11 copies the concerned history information (history information for the copied data) recorded on the rewrite information table 14 to the backup information table 16 at step S75. Then, at step S76, the virtual storage control unit 11 deletes the copied history information from the rewrite information table 14. Then, the process is ended.

On the other hand, when the virtual storage control unit 11 determines that the backup volume information is NULL at the step S72, the process directly proceeds to step S76 without the process from step S73 to step S75, and the virtual storage control unit 11 deletes the concerned history information (history information passing the number of data holding days) recorded on the rewrite information table 14. Then, the process is ended.

In this way, when the backup period is reached, the virtual storage control unit 11 provided for the virtualization switch 1 copies the data passing the number of data holding days pooled in the virtual storage pool for data integrity 3 to the virtual storage pool for backup 4 and deletes that data, and further copies the history information for the copied data recorded on the rewrite information table 14 to the backup information table 16 and deletes the history information.

As described above, according to the virtual storage control apparatus of the present invention, the data integrity can be implemented with the existent resources (for example, RAID apparatus), employing the virtualization switch 1, without preparing the dedicated hardware. Since the data integrity is implemented at a lower layer than a file system, the data integrity can be implemented without depending on the file system.

According to the present invention, the modified data can be restored in a unit of LBA. Since the data pooled in the virtual storage pool for data integrity 3 cannot be altered from the outside, the secure data integrity is implemented. Also, since the data integrity cannot be released by an operation out of the system, the data can be managed safely. Also, the existent resources such as RAID can be utilized effectively. Moreover, according to the virtual storage control apparatus of the present invention, at the timing when the write data is written in a right disk, the data is written in a sub-disk of the saving area at the same time, whereby even if the right disk breaks down, the data can be restored from the sub-disk based on the management table.

The present invention is applicable to the virtual storage control apparatus for specifying the storage block of the real disk associated with the storage block of the virtual disk designated by the host apparatus based on the correspondence between the storage block of the virtual disk and the storage block of the real disk and accessing to the specified storage block, whereby the integrity of data updated successively with the passage of time can be implemented.

What is claimed is:

1. A virtual storage control apparatus for specifying a storage block of a real disk associated with a storage block of a virtual disk designated by a host apparatus based on a correspondence between the storage block of the virtual disk and the storage block of the real disk, and for accessing the specified storage block, the virtual storage control apparatus comprising:

a storage unit storing information indicating an instruction of data integrity is set for each virtual disk;

a determination unit determining, when a write request is issued from the host apparatus, whether or not the instruction of data integrity is set for a virtual disk designated by the write request by referring to the information stored in the storage unit, the virtual disk corresponding to a first real disk in which data requested by the write request is written;

a write unit writing, when the instruction of data integrity is set for the virtual disk designated by the write request, the data requested by the write request in an empty block of a second real disk corresponding to the virtual disk for data integrity; and a recording unit recording write volume information indicating the second real disk in which the data requested by the write request is written, write request volume information indicating the virtual disk designated by the write request, and date and time information indicating a date and time when the data requested by the write request is written in the second real disk on a rewrite information storage unit; further comprising:

a first obtaining unit obtaining, when a restore request for the virtual disk is issued designating the virtual disk and the date and time information, the write request volume information of the virtual disk by referring to the rewrite information storage unit based on the designated virtual disk;

a second obtaining unit obtaining, when the first obtaining unit cannot obtain the write request volume information of the volume disk, the write volume information of the second real disk in which the data requested by the write request is written by referring to the rewrite information storage unit based on the designated date and time information; and a restore unit restoring the data of the virtual disk requested by the restore request based on the write volume information obtained by the first obtaining unit and the second obtaining unit.

2. The virtual storage control apparatus according to claim 1, wherein the first obtaining unit obtains the write volume information having the date and time information nearest to the designated date and time information.

3. The virtual storage control apparatus according to claim 1, wherein the first obtaining unit obtains the write volume information having the date and time information nearest to the designated date and time information within a certain date and time range from the designated date and time information.

4. The virtual storage control apparatus according to claim 1, wherein the first obtaining unit obtains the write volume information having the date and time information nearest to the designated date and time information not passing the designated date and time information.

5. The virtual storage control apparatus according to claim 4, wherein the first obtaining unit obtains the write volume information having the date and time information nearest to the designated date and time information within a certain date and time range from the designated date and time information and not passing the designated date and time information.

6. The virtual storage control apparatus according to according to claim 1, further comprising:
 a detection unit detecting date and time information passing a predetermined time from a time when the date and time information is recorded on the rewrite information storage unit; and
 an execution unit saving the data written in the virtual disk for data integrity in a backup storage unit, deleting the data from the virtual disk for data integrity, saving the date and time information in the backup storage unit, and deleting the date and time information from the rewrite information storage unit, based on the date and time information detected by the detection unit.

7. The virtual storage control apparatus according to claim 6, wherein the detection unit detects the date and time information passing the predetermined time based on data holding time set for each virtual disk.

8. A virtual storage control method in a virtual storage control apparatus for specifying a storage block of a real disk associated with a storage block of a virtual disk designated by a host apparatus based on a correspondence between the storage block of the virtual disk and the storage block of the real disk, and for accessing the specified storage block, the virtual storage control method comprising:
 determining, when a write request is issued from the host apparatus, whether or not an instruction of data integrity is set for a virtual disk designated by the write request by referring to information stored in a storage unit, the information indicating the instruction of data integrity is set for each virtual disk, the virtual disk corresponding to a first real disk in which data requested by the write request is written;
 writing, when the instruction of data integrity is set for the virtual disk designated by the write request, the data requested by the write request in an empty block of a second real disk corresponding to the virtual disk for data integrity; and
 recording write volume information indicating the second real disk in which the data requested by the write request is written, write request volume information indicating the virtual disk designated by the write request, and date and time information indicating a date and time when the data requested by the write request is written in the second real disk on a rewrite information storage unit;
 obtaining, when a restore request for the virtual disk is issued designating the virtual disk and the date and time information, the write request volume information of the virtual disk by referring to the rewrite information storage unit based on the designated virtual disk;
 obtaining, when the write request volume information of the volume disk cannot be obtained, the write volume information of the second real disk in which the data requested by the write request is written by referring to the rewrite information storage unit based on the designated date and time information; and
 restoring the data of the virtual disk requested by the restore request based on the write volume information obtained.

9. A computer readable storage medium storing a virtual storage control program to cause the computer to execute operations for specifying a storage block of a real disk associated with a storage block of a virtual disk designated by a host apparatus based on a correspondence between the storage block of the virtual disk and the storage block of the real disk, and for accessing the specified storage block, the operation comprising:
 determining, when a write request is issued from the host apparatus, whether or not an instruction of data integrity is set for a virtual disk designated by the write request by referring to information stored in a storage unit, the information indicating the instruction of data integrity is set for each virtual disk, the virtual disk corresponding to a first real disk in which data requested by the write request is written;
 writing, when the instruction of data integrity is set for the virtual disk designated by the write request, the data requested by the write request in an empty block of a second real disk corresponding to the virtual disk for data integrity; and
 recording write volume information indicating the second real disk in which the data requested by the write request is written, write request volume information indicating the virtual disk designated by the write request, and date and time information indicating a date and time when the data requested by the write request is written in the second real disk on a rewrite information storage unit;
 obtaining, when a restore request for the virtual disk is issued designating the virtual disk and the date and time information, the write request volume information of the virtual disk by referring to the rewrite information storage unit based on the designated virtual disk;
 obtaining, when the write request volume information of the volume disk cannot be obtained, the write volume information of the second real disk in which the data requested by the write request is written by referring to the rewrite information storage unit based on the designated date and time information; and
 restoring the data of the virtual disk requested by the restore request based on the write volume information obtained.

\* \* \* \* \*

UNITED STATES PATENT AND TRADEMARK OFFICE
CERTIFICATE OF CORRECTION

PATENT NO. : 7,673,096 B2
APPLICATION NO. : 11/589182
DATED : March 2, 2010
INVENTOR(S) : Katsuo Aoyama It is certified that error appears in the above-identified patent and that said Letters Patent is hereby corrected as shown below:

Column 15, Line 16, before "claim" delete "according to". (second occurrence)

Signed and Sealed this

Thirteenth Day of July, 2010

David J. Kappos
*Director of the United States Patent and Trademark Office*